United States Patent
Tachibana

[11] Patent Number: 6,112,716
[45] Date of Patent: Sep. 5, 2000

[54] FUEL INJECTION CONTROL SYSTEM FOR INTERNAL COMBUSTION ENGINE OF CYLINDER INJECTION TYPE

[75] Inventor: Ken Tachibana, Tokyo, Japan

[73] Assignee: Mitsubishi Denki Kabushiki Kaisha, Tokyo, Japan

[21] Appl. No.: 09/165,350

[22] Filed: Oct. 2, 1998

[30] Foreign Application Priority Data

Apr. 13, 1998 [JP] Japan .................................. 10-101150

[51] Int. Cl.$^7$ .................................................. F02D 41/06
[52] U.S. Cl. ........................................... 123/305; 123/299
[58] Field of Search ................... 123/299, 300, 123/305, 491

[56] References Cited

U.S. PATENT DOCUMENTS

| | | | |
|---|---|---|---|
| 4,469,072 | 9/1984 | Kobayashi et al. ...................... | 123/491 |
| 5,482,017 | 1/1996 | Brehob et al. ........................... | 123/299 |

FOREIGN PATENT DOCUMENTS 4-183922   6/1992   Japan .

*Primary Examiner*—Andrew M. Dolinar
*Attorney, Agent, or Firm*—Sughrue, Mion, Zinn, Macpeak & Seas, PLLC

[57] ABSTRACT

In an internal combustion engine of a cylinder injection type, a fuel injection control system for controlling fuel injection/combustion effected during an expansion stroke or an exhaust stroke of the engine in order to heat a catalyst to a light-on temperature as soon as possible in an engine starting phase while protecting the catalyst against degradation/dissolution and ensuring purification of exhaust gas at an earlier stage regardless of changes in the ambient temperature and the state of a motor vehicle prevailing when the engine is restarted from the cold state or when the engine is restarted after having been stopped in the warmed-up state and additionally proper temperature rise as well as prevention of discharge of unburnt gas. The system includes fuel injection valves (47 to 50) capable of injecting fuel under high pressure directly into combustion chambers (24, 26, 28, 30) of an engine (10), an engine start detecting means for detecting starting of the engine (10), a temperature detecting means (55) for detecting temperature ($T_W$) of the engine (10), and an engine low-temperature state detecting means (22) for detecting whether or not the engine is at a low temperature by comparing a detected value ($T_W$) derived from output of the temperature detecting means (55) with a predetermined value stored previously.

6 Claims, 14 Drawing Sheets

FIG. 12

| #1 | C | E | EH | S | C | E | EH | S | C | E | EH | S | C | E | EH | S |
|---|---|---|---|---|---|---|---|---|---|---|---|---|---|---|---|---|
| #3 | S | C | E | EH | S | C | E | EH | S | C | E | EH | S | C | E | SH |
| #4 | EH | S | C | E | EH | S | C | E | EH | S | C | E | EH | S | C | E |
| #2 | E | EH | S | C | E | EH | S | C | E | EH | S | C | E | EH | S | C |

NOTE: "S" REPRESENTS SUCTION STROKE.
"C" REPRESENTS COMPRESSION STROKE.
"E" REPRESENTS EXPANSION STROKE.
"EH" REPRESENTS EXHAUST STROKE.
"Ij1" REPRESENTS ORDINARY FUEL INJECTION AND IGNITION.
"Ij2" REPRESENTS ADDITIONAL (SECONDARY) FUEL INJECTION AN IGNITION FOR RAISING CATALYST TEMPERATURE.

FIG. 13

| | | | | | | | | | | | | | | | |
|---|---|---|---|---|---|---|---|---|---|---|---|---|---|---|---|
| #1 | C ▨ | E ▨ | EH | S | EH | C ▨ | E ▨ | EH | C ▨ | S | C ▨ | E ▨ | EH | E ▨ | S |
| #3 | S | C | E ▨ | E ▨ | C | S | C | E ▨ | S | EH | E ▨ | C | S | E | EH |
| #4 | EH | S | C ▨ | EH | E ▨ | C ▨ | S | EH | E ▨ | C ▨ | S | EH | C ▨ | C ▨ | E ▨ |
| #2 | E ▨ | EH | S | C | E | EH | S | C ▨ | EH | E | C | S | EH | S | C |

NOTE:
"S" REPRESENTS SUCTION STROKE.
"C" REPRESENTS COMPRESSION STROKE.
"E" REPRESENTS EXPANSION STROKE.
"EH" REPRESENTS EXHAUST STROKE.
"▨" REPRESENTS ORDINARY FUEL INJECTION AND IGNITION.
"▨" REPRESENTS ADDITIONAL (SECONDARY) FUEL INJECTION AN IGNITION FOR RAISING CATALYST TEMPERATURE.

■ Ij1
▨ Ij2
◊ IO

FUEL INJECTION CONTROL SYSTEM FOR INTERNAL COMBUSTION ENGINE OF CYLINDER INJECTION TYPE

BACKGROUND OF THE INVENTION

1. Field of the Invention

The present invention generally relates to a fuel injection control system for a cylinder injection type internal combustion engine also known as the direct injection type internal combustion engine. More particularly, the invention is concerned with a fuel injection control system for controlling the fuel injection into the cylinders of the cylinder injection type engine so that a catalyst contained in a catalytic converter disposed in an exhaust gas pipe of the engine can be speedily heated to a light-on temperature, i.e., temperature at which the catalyst begins to be activated in a starting phase of the engine operation.

2. Description of Related Art

In general, a three way catalytic converter is used for purifying an exhaust gas of an internal combustion engine which hereinafter will also be referred to simply as the engine. In this conjunction, it is noted that when the temperature of the catalyst is lower than the light-on temperature as in the case of the cold start of the engine where the engine is stored from a low temperature state, the exhaust gas components such as HC, CO and the like are discharged to the atmosphere without being trapped by the catalytic converter. With a view to coping with this problem, there have already been proposed various measures for promoting speedily the purifying performance or efficiency of the catalytic converter. By way of example, according to one approach, a heater device is installed in the exhaust gas pipe of the engine for heating the catalyst in order to realize high purification efficiency or performance of the catalytic converter as early as possible in the start phase of the engine operation.

As another attempt for heating the catalyst to a desired temperature or light-on temperature, there is disclosed in Japanese Unexamined Patent Application Publication No. 183922/1992 a fuel injection control system for a cylinder injection type spark ignition engine equipped with a temperature sensor for a catalytic converter. The fuel injection control system is so designed that an additional fuel injection is effectuated during an expansion or exhaust stroke for allowing the exhaust gas admixed with the additionally injected fuel to undergo combustion within the exhaust gas pipe with a view to heating the catalyst up to a desired temperature or light-on temperature.

The conventional catalyst heating systems however suffer from a problem that high cost is involved due to need for installation of a heater device in the exhaust gas pipe for raising the temperature of the catalyst or need for installation of a temperature sensor and a second spark plug within the exhaust gas pipe on the way to the exit thereof.

SUMMARY OF THE INVENTION

In the light of the state of the art described above, it is an object of the present invention to provide a fuel injection control system for a cylinder injection type internal combustion engine which is capable of raising speedily the temperature of the catalyst substantially independent of changes in the ambient or atmospheric temperature without incurring dissolution or detriment of the catalyst.

Another object of the present invention is to provide a fuel injection control system for a cylinder injection type engine which can be implemented inexpensively without the need for provision of additional components such as a catalyst temperature sensor and others.

In view of the above and other objects which will become apparent as the description proceeds, there is provided according to a general aspect of the present invention a fuel injection control system for an internal combustion engine of a cylinder injection type, wherein fuel is injected directly into a cylinder through a fuel injection valve. The system mentioned above includes an engine start detecting means for detecting starting of the internal combustion engine, a temperature detecting means for detecting temperature of the engine, an engine low-temperature state detecting means for detecting whether or not the engine is in a cold state by comparing a detected value derived from the output of the temperature detecting means with a predetermined value stored previously, and a control means for controlling the fuel injection valve so as to effectuate expansion-stroke fuel injection during an expansion stroke or alternatively exhaust-stroke fuel injection during an exhaust stroke only for a predetermined time period or over a predetermined stroke length in succession to the start of the fuel injection, provided that starting of the internal combustion engine is detected from the output of the engine start detecting means and that low-temperature state of the engine is detected from the output of the engine low-temperature state detecting means.

By virtue of the arrangement that the expansion-stroke fuel injection or the exhaust-stroke fuel injection is limited to a predetermined time period or a predetermined temporal duration, as mentioned above, there can be achieved very advantageous effects that the exhaust gas purifying action can be ensured satisfactorily even in an earlier state of the engine operation because of the speedy temperature rise of the catalyst, while the catalyst can be protected against excessive heating. Additionally, occurrence of engine stall due to deterioration of the fuel injection and fuel jamming thereof can positively be suppressed.

In a preferred mode for carrying out the invention, the control means may be so designed as to set variably the aforementioned predetermined time in dependence on a detected value derived from the output of the temperature detecting means.

With the arrangement described above, there can be achieved advantageous effects and actions such as protection of the catalyst against degradation/dissolution due to heating, purification of the exhaust gas owing to the temperature rise of the catalyst at an earlier stage regardless of change of the ambient or atmospheric temperature and the states of the motor vehicle prevailing when the engine is restarted from the cold state, i.e., upon cold restart of the engine or when the engine is restarted after having been stopped in the warmed-up state.

In another preferred mode for carrying out the invention, the control means may be so designed as to perform the expansion-stroke fuel injection or alternatively the exhaust-stroke fuel injection only during a time period which is required for a value resulting from integration of output values of the fuel injection quantity control signal to attain a predetermined accumulated value.

In conjunction with the arrangement described above, it can be appreciated that by storing previously in an electronic control unit or an ECU as data the integrated, accumulated value of the fuel injections or number of times the fuel injection is to be performed which represents the heat quantity required for attaining a predetermined temperature of the catalyst, the proper or optimal temperature rise conforming to the preventing temperature of the catalyst can be achieved, whereby discharge of the undesirable unburnt gases can be positively prevented even in the engine starting phase.

In yet another preferred mode for carrying out the invention, the predetermined accumulated value may be set variably in dependence on detection value derived from the output of the temperature detecting means.

With the arrangement mentioned above, the temperature rise control of the catalyst can be carried out with enhanced accuracy.

In still another preferred mode for carrying out the invention, the control means may be so designed as to decrease gradually the fuel injection quantity in the expansion-stroke fuel injection or exhaust-stroke fuel injection as a function of time lapse or alternatively as a function of a number of times the expansion stroke has been carried out.

By virtue of the above-mentioned arrangement, the heat quantity applied to the catalyst is decreased as a function of time lapse, whereby the temperature of the catalyst can be stabilized at a predetermined value without giving rise to overshoot. Furthermore, owing to speedy and appropriate heating of the catalyst, prevention of discharge of the unburned gas components can be achieved with high reliability.

In a further preferred mode for carrying out the invention, the control means may be so designed as to start the expansion-stroke fuel injection or alternatively the exhaust-stroke fuel injection after the engine starting operation has been successfully completed or alternatively after lapse of a predetermined time in succession to the successful completion of the engine starting operation.

With the arrangement mentioned above, the temperature rise of the catalyst can be realized while suppressing engine starting failure and/or abnormal engine rotation speed.

In a yet further preferred mode for carrying out the invention, the control means may effectuate fuel injection in the expansion stroke or alternatively in the exhaust stroke only for particular one of the cylinders of an internal combustion engine.

With the arrangement of the fuel injection control system described above, the quantity of fuel injected in the engine cylinder during the idle operation can be minimized while ensuring high-accuracy control of a heat quantity applied to the catalyst. Additionally, in the fuel injection control system described above, the engine cooling water temperature sensor and/or the intake air temperature sensor can be employed for the fuel injection control. To say in another way, the object of the invention, i.e., increasing the temperature of the catalyst to the light-on temperature thereof earlier in the starting phase of the engine operation can be achieved without need for additional provision of the sensor for detecting the temperature of the catalyst simply by altering partially the control program executed by the fuel injection control system. Thus, the object of the present invention can be accomplished economically without increasing the cost as involved in implementation.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 12 is a timing chart for illustrating operation of the fuel injection control carried out by a fuel injection control system according to a sixth embodiment of the present invention;

FIG. 13 is a timing chart for illustrating a modified fuel injection control which can be carried out by the fuel injection control system according to the sixth embodiment of the present invention.

DESCRIPTION OF THE PREFERRED EMBODIMENTS

General Description

Figure 1:
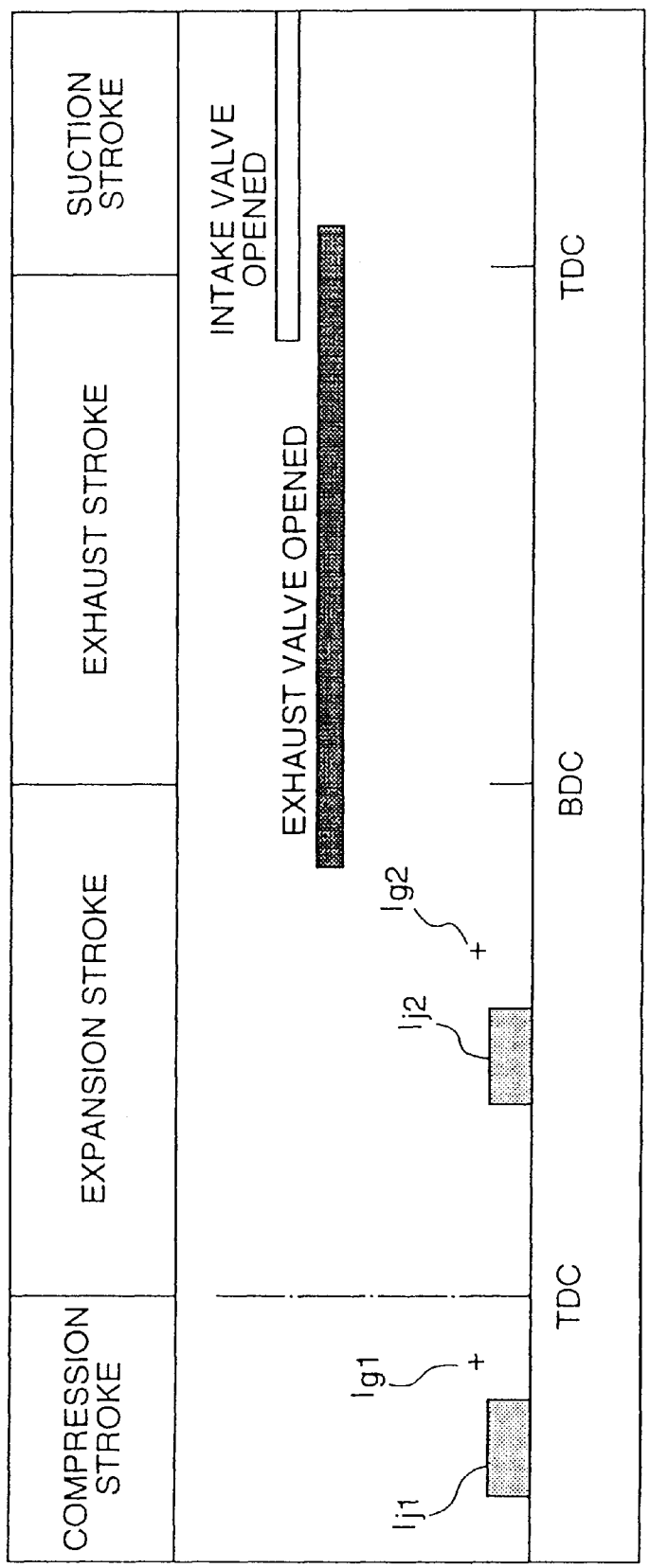
FIG. 1 is a timing chart for illustrating piston strokes in a cylinder injection type internal combustion engine to which the present invention can be applied.
Figure 2:
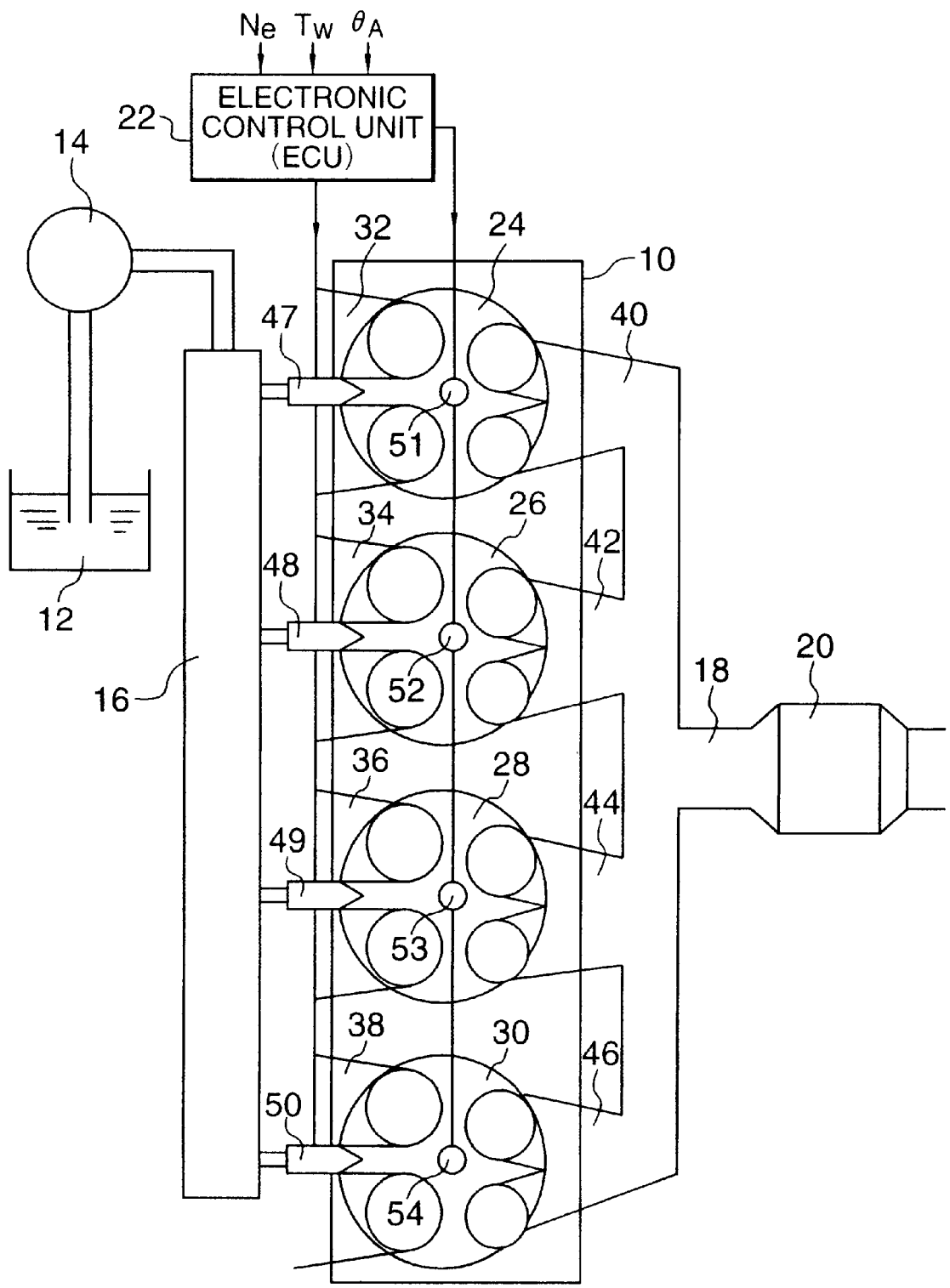
FIG. 2 is a diagram showing generally and schematically a structure of a cylinder injection type internal combustion engine for which a fuel injection control system according to the present invention can be adopted.

Before entering into detailed description of the exemplary or preferred embodiments of the present invention, the basic concept or principle underlying the invention will first be described by reference to FIGS. 1 to 3. As is shown in FIG. 2, the cylinder injection type internal combustion engine system to which the present invention can find application is comprised of an engine body 10, a fuel tank 12, a high-pressure fuel pump 14 for pressurizing a fuel supplied from the fuel tank 12 to a high pressure level, a delivery pipe 16 provided in common to the individual engine cylinders for storing temporarily the pressurized fuel in precedence to feeding distributively the fuel to the individual engine cylinders, an exhaust gas passage 18 through which the exhaust gases expelled from the individual cylinders are collectively discharged to the atmosphere, a catalytic converter 20 containing a catalyst and installed in the exhaust gas passage 18 for purifying the exhaust gas, an electronic control unit 22 which hereinafter will also be referred to as the ECU in abbreviation for controlling operation state of the cylinder injection type internal combustion engine, and so forth.

The electronic control unit or ECU 22 functionally includes an engine low-temperature state detecting means, a control means for controlling fuel injection valves and other control means, as described hereinafter.

The combustion chambers 24, 26, 28 and 30 of the individual cylinders are provided with intake ports 32, 34, 36 and 38 and exhaust ports 40, 42, 44 and 46, respectively. Each of the intake ports includes a pair of intake valves while each of the exhaust ports has a pair of exhaust valves, wherein the individual exhaust ports 40, 42, 44 and 46 are combined together and placed in the state communicated to the catalytic converter 20 by way of the exhaust gas passage 18.

Mounted on the cylinder heads of the engine are fuel injection valves 47 to 50 having respective tip end portions adapted to be opened into the associated combustion chambers 24, 26, 28 and 30, respectively. More specifically, when a piezoelectric element (not shown) is electrically energized under the control of the ECU 22, a fuel injection port or jet nozzle of the associated fuel injection valve 47; 48; 49; 50 is opened, whereby the fuel of high pressure is injected into the combustion chamber 24; 26; 28; 30 from the delivery pipe 16. At this juncture, it should be added that since the pressure within the delivery pipe 16 is substantially constant, the amount or quantity of the fuel injected into the combustion chamber which hereinafter will also be referred to as the fuel injection quantity is proportional to the time duration or period during which the jet nozzle of the fuel injection valve 47; 48; 49; 50 is held in the opened state.

Spark plugs 51 to 54 are mounted in the vicinity of the top walls of the combustion chambers 24, 26, 28 and 30, respectively. Inputted to the ECU 22 are signals indicative of load states of the engine such as the engine rotation speed or number Ne (rpm), the throttle opening degree $\theta_A$ and the like from various relevant sensors (not shown). Additionally, a signal representing the temperature $T_W$ of the engine is inputted to the ECU 22 from a water temperature sensor (not shown) provided for detecting the temperature of engine cooling water. On the basis of these input signals, the ECU 22 generates a fuel injection quantity control signal $Q_{ij}$ commanding the timing at which the fuel injection valve 47; 48; 49; 50 is to be opened as well as the period during which the fuel injection valve is to be held in the opened state, respectively. Additionally, the ECU 22 generates an ignition timing control signal $e_{ig}$ commanding the timing for electrically energizing the spark plug 51; 51; 53; 54.

Figure 3A:
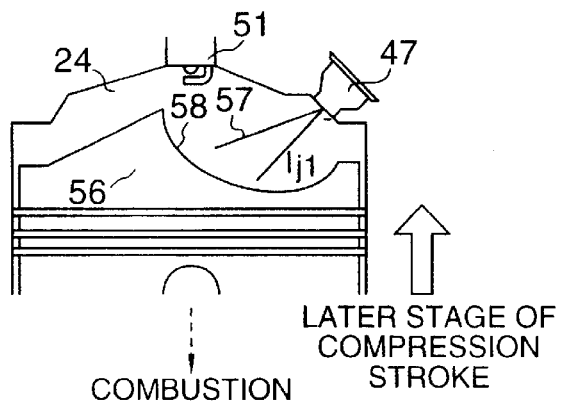
FIG. 3A is a fragmentary sectional view of an engine cylinder showing a first or primary fuel injection performed at a later stage of a compression stroke.
Figure 3B:
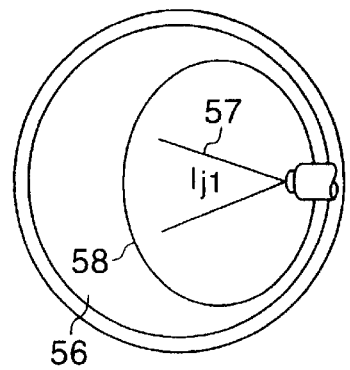
FIG. 3B is a plan view of the same.

Now, referring to FIGS. 3A to 3E in combination with FIG. 1, the basic concept underlying the fuel injection control system according to the present invention will be described. FIG. 3A to 3E are views showing an engine cylinder structure associated with the combustion chamber 24 as the representative of the four cylinders and illustrating major phenomena taking place in the combustion chamber. Further, FIG. 1 is a timing chart for illustrating piston strokes in the cylinder injection type internal combustion engine, being understood that the other cylinders are each implemented in a similar structure. It should however be noted that the operation timings for these cylinders differ from one another by 180° CA i.e., in terms of crank angle in the ignition sequence. Illustrated in FIG. 3A is a state prevailing within the combustion chamber at a later stage of the compression stroke in which a piston 56 has been displaced upwardly to a position close to the top dead center with both the intake valve and the exhaust valve (not shown) being closed. In this state, the jet nozzle of the fuel injection valve 47 is opened only for a time period commanded by the ECU 22, whereby the fuel of a quantity which is indicated by the fuel injection quantity control signal $Q_{ij}$ is injected in the form of a fuel spray 57 into a concave 58 having a predetermined depth and formed in the top surface of the head of the piston 56. This fuel injection is referred to as the first or primary fuel injection $I_{j1}$. This fuel injection $I_{j1}$ is shown in FIG. 1 as well. In the case of the illustrated instance, the first or primary fuel injection $I_{j1}$ is shown as taking place only within the concave 58, as can be seen from a plan view of FIG. 3B. However, this is only for the purpose of illustration. The fuel injection may occur in other various forms.

As a result of the first or primary fuel injection $I_{j1}$, a mass of richest mixture gas of ca. stoichiometric mixture ratio is formed within the combustion chamber 24 in the vicinity of the spark electrode of the spark plug 51. Consequently, when electric discharge is caused to occur at the spark plug 51 under electric energization thereof in response to the ignition timing control signal $e_{ig}$ generated by the ECU 22 at a timing when the piston head is positioned close to the top dead center, the rich mixture gas portion prevailing around the spark plug 51 is initially fired as first ignition $i_{g1}$ to thereby form a so-called flame seed or core from which flame travels through peripheral lean gas mixture within the combustion chamber 24, involving thus combustion of the whole mixture as first or primary combustion.

Owing to the process described above, such lean gas mixture which can not be fired only with the electric spark produced by the spark plug 51 can speedily undergo the combustion wholly. In succession to the ignition $I_{g1}$ as shown in FIG. 1 and the combustion of the gas mixture within the combustion chamber 24, an expansion or explosion stroke is carried out in which the piston 56 is forced to move downwardly. In that case, at an appropriate time point in the expansion stroke, e.g. between a middle point of the expansion stroke and the bottom dead center, there takes place a second or secondary fuel injection into the combustion chamber 24 from the fuel injection valve 47. This fuel injection $I_{j2}$ is also shown in FIG. 1.

Figure 3C:
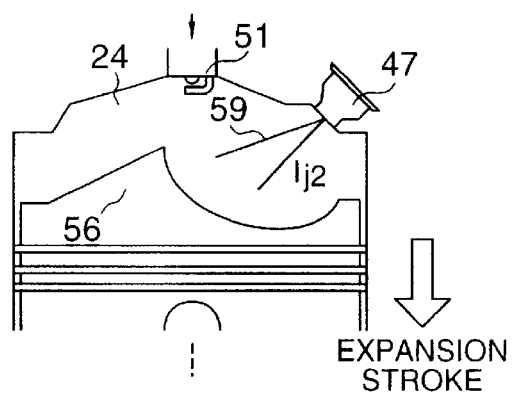
FIG. 3C is a fragmentary sectional view of an engine cylinder showing a second or secondary fuel injection carried out in an expansion stroke.
Figure 3D:
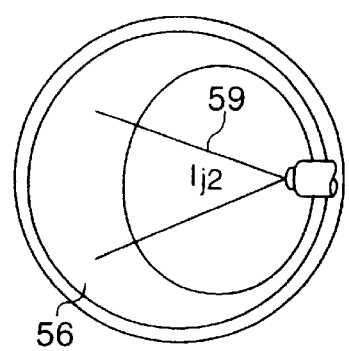
FIG. 3D is a plan view of the same.

More specifically, referring to FIGS. 3C and 3D, a fuel spray 59 is produced as the result of the second or secondary fuel injection $I_{j2}$ mentioned above. Since the piston 56 is then moving downwardly toward the bottom dead center, the fuel mixture as injected are caused to impinge onto the top surface of the head of the piston 56 over a large area. At that time, the top surface of the piston 56 is at a high temperature. Consequently, the fuel is instantaneously vaporized to be mixed with the expanded combustion gas 60 i.e., gas resulting from the first or primary combustion mentioned previously within the cylinder. Since the cylinder injection type engine is operated with the air being charged in excess, a sufficient amount of the air which allows the fuel supplied through the second fuel injection $I_{j2}$ to undergo combustion remains available, being contained in the combustion gas 60. of course, it is possible to regulate the second fuel injection $I_{j2}$ such that the exhaust gas can attain the desired stoichiometric mixture ratio.

Figure 3E:
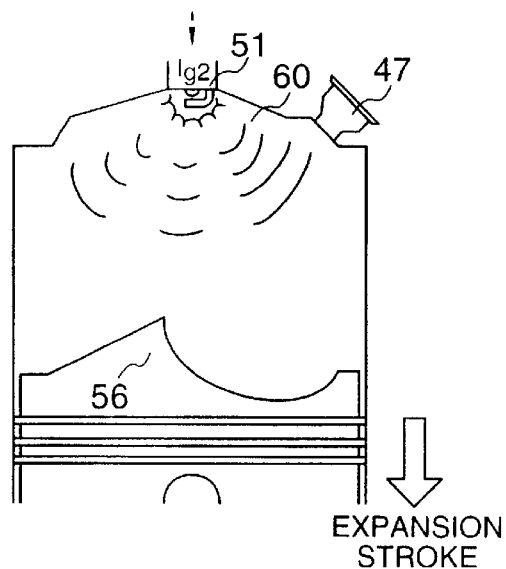
FIG. 3E is a view similar to FIG. 3C and shows a state in which a second ignition takes place.

By virtue of the fuel injection process described above, there can be employed even the three way catalyst in the catalytic converter 20. As can be seen in FIG. 1 and FIG. 3E, the second ignition $I_{g2}$ and hence the second combustion of the fuel charged through the second fuel injection $I_{j2}$ are carried out by electrically energizing the spark plug 51 mounted within the combustion chamber 24 of the engine body 10 at a proper time point during a latter half of the expansion stroke in which the piston 56 is moving downwardly from the top dead center.

The second combustion mentioned above is effective for raising the temperature of the exhaust gas flowing and prevailing over a wide range covering not only the interior of the cylinder such as the combustion chamber 24 but also the exterior thereof such as the exhaust port 40 and the exhaust gas passage 18 shown in FIG. 2. Thus, the catalyst contained in the catalytic converter 20 is heated speedily to attain the light-on temperature i.e., the temperature at which the catalyst begins to be activated and can exhibit satisfactorily the exhaust gas purification performance.

When it is decided by the ECU 22 that the engine temperature $T_W$ derived from the output of the cooling water temperature sensor has attained or exceeded a desired temperature determined previously by taking into consideration the light-on temperature of the catalyst, the second fuel injection $I_{j2}$ and the second ignition $I_{g2}$ and hence the second combustion in the expansion stroke are inhibited under the command issued by the ECU 22, whereon the ordinary operation state of the engine is resumed, in which the second or secondary combustion for heating the catalyst is no more carried out.

The cylinder injection type engine differs from the conventional internal combustion engine in the respect that the fuel can be charged into the combustion chamber 24; 26; 28; 30 by driving the associated fuel injection valve 47; 48; 49; 50 even during the expansion stroke or the exhaust stroke in which the intake valve of the engine is closed. By taking advantage of this feature, in the fuel injection control system according to the invention, the second or secondary fuel injection $I_{j2}$ is performed during the expansion stroke with the second ignition $I_{g2}$ being effectuated by making use of the spark plug 51; 52; 53; 54 mounted in the combustion chamber 24; 26; 28; 30 in order to increase or raise the temperature of the catalyst by heating the exhaust gas prevailing within the exhaust port 40; 42; 44; 46 and the exhaust gas passage 18 among others.

At this juncture, it should be mentioned that the fuel injection control system according to the present invention thus features that the fuel injection in the expansion stroke is validated only during a predetermined period e.g. within a time period of forty seconds in the course of engine warming-up after the start of the engine. By virtue of this feature, the temperature of the catalyst can be raised sufficiently high while preventing the temperature of the catalyst from increasing excessively.

In the fuel injection control system according to the present invention, the second or secondary combustion for raising the temperature of the catalyst as described above can be realized without modifying or changing the hardware arrangement of the conventional or existing fuel injection control system simply by modifying partially the control program executed by the ECU 22.

In that case, there arises no need for additional provision of any specific device. In this conjunction, it should further be mentioned that generation of torque which urges to reverse the rotation of the engine as well as occurrence of reverse flow of the combustion gas toward the intake pipe can positively be prevented by arranging or programming such that the second ignition $I_{g2}$ is forced to occur during the latter half of the expansion stroke.

The foregoing description has been made on the assumption, only by way of example, that the second ignition $I_{g2}$ is carried out during the expansion stroke in succession to the second fuel injection $Ij_2$. It should be however appreciated that the second or secondary ignition $Ig^2$ can be spared by resorting to self-ignition, spontaneous firing or alternatively the second ignition $I_{g2}$ may be effected in the course of the exhaust stroke.

Now, the present invention will be described in detail in conjunction with what is presently considered as preferred or typical embodiments thereof by reference to the drawings. Parenthetically, in the following description, like reference characters are used for designating like or corresponding parts throughout the several views.

Embodiment 1

Description will turn to a fuel injection control system according to a first embodiment of the present invention.

Figure 4:
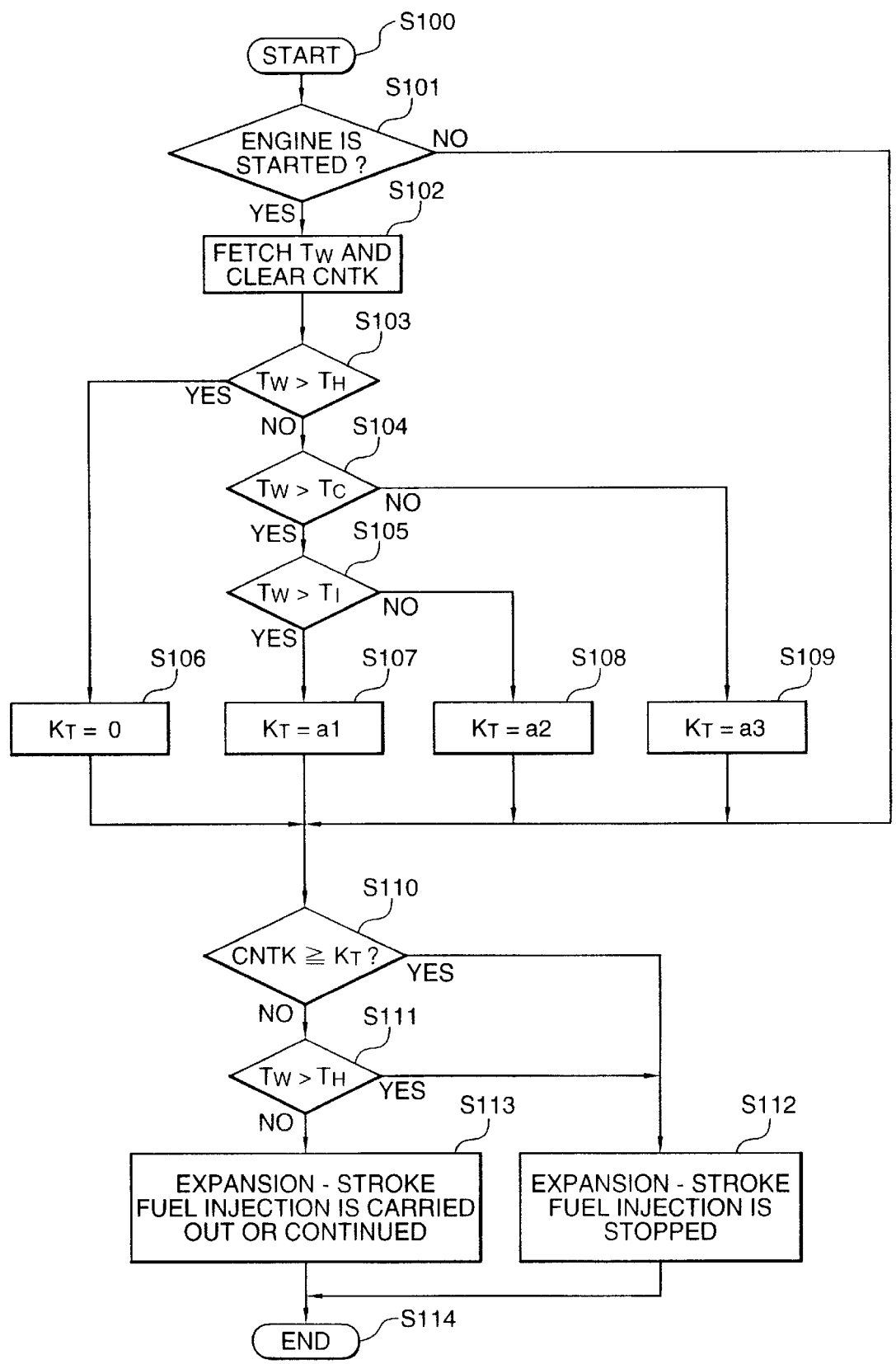
FIG. 4 is a flow chart for illustrating a control program executed by a fuel injection control system according to a first embodiment of the present invention.

FIG. 4 is a flow chart for illustrating a control program executed by the fuel injection control system according to the instant embodiment. At first, it should be mentioned that the control program now concerned is repetitively executed by the ECU 22 once for two rotations of the crank shaft.

Referring to FIG. 4, when the control program is started in a step S100, it is then decided or determined in a step S101 by an engine start detecting means (not shown) whether or not the engine is in the state being started. Hereinafter, this state will be referred to as the engine starting state or phase.

When decision is made in the step S101 that the engine is in the starting state or phase i.e., when the decision step S101 results in affirmation "Yes", execution of the control program or to say in another way, the processing proceeds to a step S102. On the other hand, when it is decided that the engine is not in the starting phase i.e., when the result of the decision step S101 is negative "No", the processing proceeds to a step S110. Parenthetically, with the phrase "engine starting state or phase" mentioned above, it is contemplated to mean the state in which the engine starter is being driven. Alternatively, the state in which the engine rotation speed (rpm) is lower than a predetermined value may be defined as the starting state or phase. Further, the engine starting state or phase may be determined by deciding whether or not the current execution of the control program now under consideration corresponds to the first run.

Subsequently, in the step S102, the engine temperature such as cooling water temperature $T_W$ is fetched with a counter CNTK being cleared. In a step S103, the engine temperature $T_W$ is compared with a predetermined warm-up temperature $T_H$. When the engine temperature $T_W$ is higher than the predetermined warm-up temperature $T_H$ as in the case where the engine is restarted, the processing proceeds to a step S106 and, if otherwise, to a step S104. In the step S104, the engine temperature $T_W$ is compared with a predetermined low temperature $T_C$. The predetermined low temperature $T_c$ may be set at a cryogenic temperature, e.g. of −30° C.

In case it is decided in the step S104 that the engine temperature $T_W$ is higher than the predetermined low temperature $T_c$, the processing proceeds to a step S105 and, if otherwise, to a step S109. In the step S105, the engine temperature $T_W$ is compared with a predetermined temperature $T_1$ which is set to be lower than the predetermined warm-up temperature $T_H$ mentioned above and higher than the predetermined low temperature $T_C$ also mentioned above. When the engine temperature $T_W$ is higher than the predetermined temperature $T_1$, the processing proceeds to a step S107. If otherwise, it proceeds to a step S108. In the steps S106 to S109, predetermined time durations or periods $K_T$ of different values "0", "a1", "a2" and "a3", respectively, are selectively set for the second or secondary fuel injection control in the expansion stroke i.e., $I_{j2}$ shown in FIG. 1. Parenthetically, the fuel effected injection during the expansion stroke will also be referred as the expansion-stroke fuel injection. Similarly, the fuel injection effected during the exhaust stroke will also be referred to as the exhaust-stroke fuel injection.

In the step S106, the predetermined time period $K_T$ for the expansion-stroke fuel injection control is reset to zero, whereon the step S110 is executed. In the step S107, a predetermined value al stored previously in the ECU 22 in correspondence to the engine temperature $T_W$ ($T_H \geq T_W > T_1$) is set to $K_T$ as a predetermined time period for a single expansion-stroke fuel injection. On the other hand, in the step S108, another predetermined value a2 also stored in the ECU 22 is set to the predetermined time period $K_T$, while a further predetermined value a3 also stored in the ECU 22 is set to the predetermined time period $K_T$ in the step S109. In this way, the predetermined time periods for effectuating the expansion-stroke fuel injection are set to $K_T$ in dependence on the detected values of the engine temperature $T_W$, respectively.

In the step S110, the counter CNTK is compared with the predetermined time $K_T$ for thereby deciding or determining whether or not the predetermined time period has lapsed from the start of the engine. To this end, the counter CNTK is so designed as to be incremented upon every timer interruption (not shown). When the starting state is decided in the step S101, the counter CNTK is cleared, while being clipped at a maximum value. When it is decided that the above-mentioned predetermined time period $K_T$ has lapsed, execution of the control program proceeds to a step S112. If otherwise, it proceeds to a step S111.

In the step S111, decision is made as to whether or not the engine temperature $T_W$ is higher than the predetermined warm-up temperature $T_H$. In case the engine temperature $T_W$ is higher than the predetermined warm-up temperature $T_H$, the processing proceeds to the step S112 and, if otherwise, to a step S113.

In the step S113, the expansion-stroke fuel injection control is carried out or continued as the case may be. As a consequence, the second or secondary combustion takes place to raise the temperature of the catalyst, as described hereinbefore.

In the step S112, the expansion-stroke fuel injection control is invalidated or stopped. More specifically, when decision is made in the step S101 that the predetermined time has lapsed from the engine start or when it is decided in the step S111 that the engine temperature $T_W$ is higher than the predetermined warm-up temperature $T_H$, the expansion-stroke fuel injection control is stopped. Thus, the control program comes to an end in a step S114. Thereafter, the ordinary engine operation state continues without being accompanied by any more occurrence of the second or secondary combustion.

As is apparent from the above, in the fuel injection control system for the cylinder injection type engine according to the first embodiment of the invention, the predetermined time period $K_T$ mentioned above can be set variably in dependence on the detected temperature value derived from the output of the temperature detecting means. By virtue of this feature, there can be achieved the protection of the catalyst against degradation/dissolution as well as purification of the exhaust gas at an earlier stage regardless of change of the ambient or atmospheric temperature and that of the operation state of the motor vehicle prevailing when the engine is restarted from the cold state i.e., upon cold restart of the engine or when the engine is restarted after having been stopped in the warmed-up state. In the foregoing description of the fuel injection control system according to the first embodiment of the invention, it has been assumed that the predetermined time period $K_T$ mentioned above can be set variably and selectively at one of the three values al, a2 and a3. However, it goes without saying that the predetermined time period $K_T$ can be set variably and selectively at a greater number of values "a" by reading out selectively the predetermined value from the data map stored in the ECU 22 by using the engine temperature as parameter.

At this juncture, it should be mentioned that an intake air temperature sensor, an oil temperature sensor, a catalyst temperature sensor, an exhaust gas temperature sensor or the like may also be used as the engine temperature sensor. Further, instead of incrementing the counter CNTK as a function of time lapse, it is possible to increment the counter CNTK upon every complete rotation of the crank shaft. Additionally, although the control program illustrated in FIG. 4 is so implemented as to include the step S111 for stopping or inhibiting the expansion-stroke fuel injection when the engine temperature rises up before the relevant predetermined time period has elapsed, the step S111 may be spared.

Embodiment 2

Figure 5:
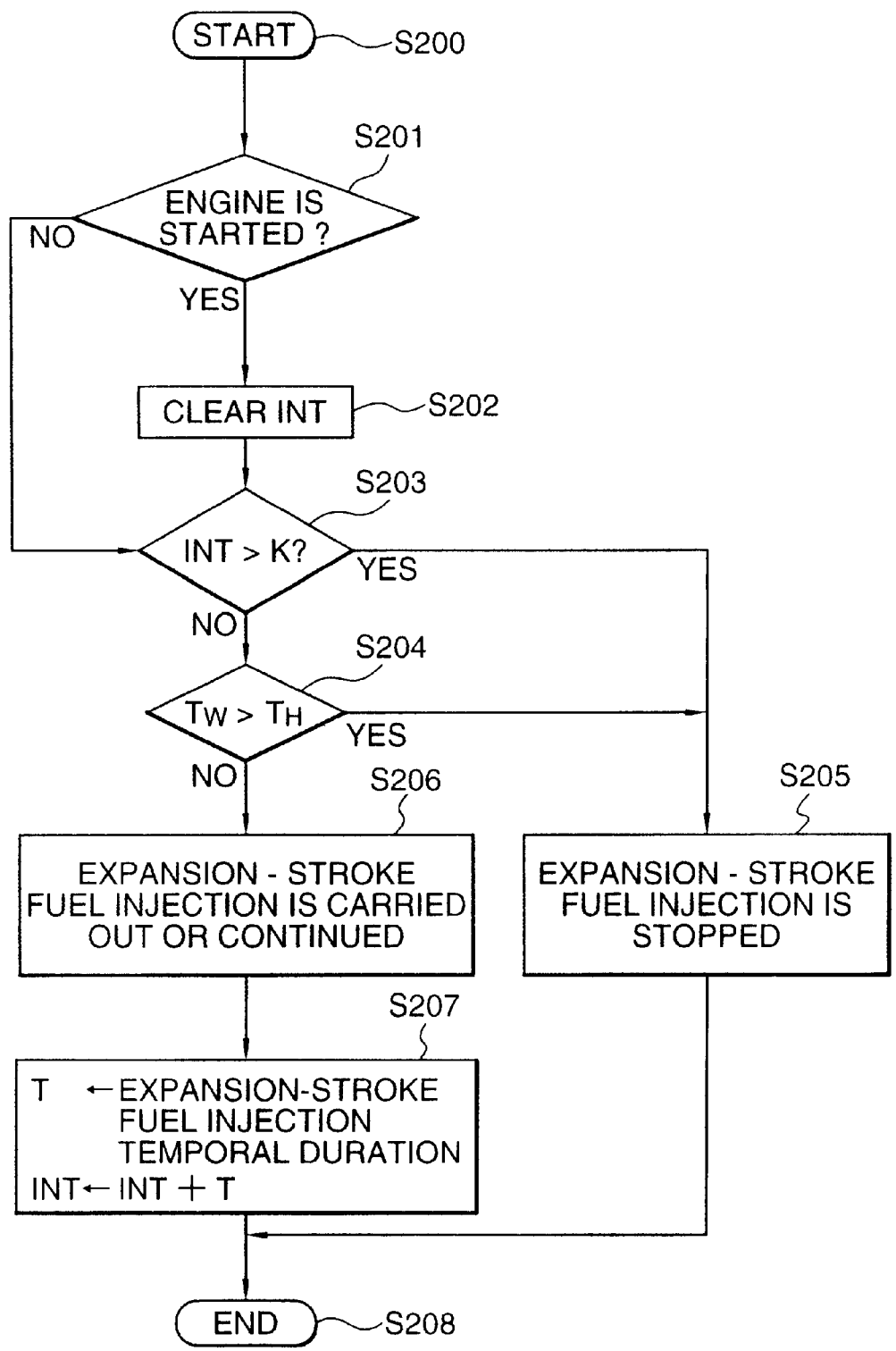
FIG. 5 is a flow chart for illustrating a control program executed by a fuel injection control system according to a second embodiment of the present invention.
Figure 6:
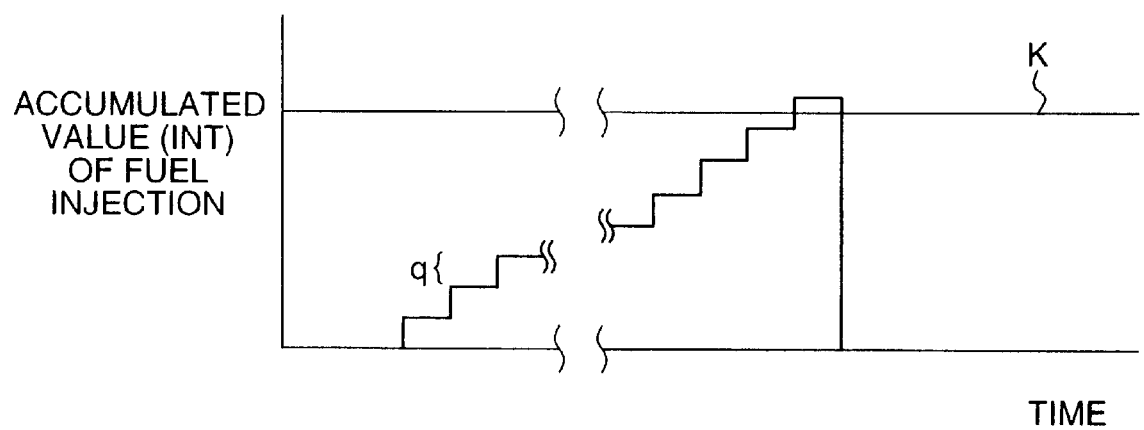
FIG. 6 is a timing chart for illustrating contents of the fuel injection control executed by the fuel injection control system according to the second embodiment of the present invention.

Next, description will be directed to a fuel injection control system according to a second embodiment of the present invention. FIG. 5 is a flow chart for illustrating contents of a control program executed by the fuel injection control system according to the instant embodiment, and FIG. 6 is a timing chart for illustrating the same. The control program now concerned is repetitively executed by the ECU 22 once for two rotations of the crank shaft in a four-cycle cylinder injection type internal combustion engine.

Referring to FIG. 5, when the control program is started in a step S200, it is then decided in a step S201 whether or not the engine is in the engine starting state or phase. When decision is made in the step S201 that the engine is in the starting state i.e., when the decision step S201 results in affirmation "Yes", execution of the control program proceeds to a step S202 to clear an accumulated value INT mentioned hereinbelow. On the other hand, when it is decided that the engine is not in the starting state or phase i.e. , when the result of the decision step S201 is negative "No", the processing skips the step S202 to proceed to a step S203.

In the step S203, a predetermined value K which represents an integration value of the fuel injection quantities required for attaining a predetermined temperature and which is previously stored in the ECU 22 is compared with the accumulated or integrated value INT of the fuel injection quantities q. Unless the fuel injection accumulation value INT exceeds the predetermined value K, the processing proceeds to a step S204. If otherwise, it proceeds to a step S205.

In the step S204, decision is made as to whether or not the engine temperature $T_W$ is higher than the predetermined warm-up temperature $T_H$ mentioned previously. In case the engine temperature $T_W$ is higher than the predetermined warm-up temperature $T_H$, the processing proceeds to a step S205 and, if otherwise, to a step S206. In the step S205, the expansion-stroke or exhaust-stroke fuel injection is intercepted. On the other hand, in the step S206, the expansion-stroke fuel injection or exhaust-stroke fuel injection is carried out or continued.

In a step S207, a value indicating a one-cycle valve opening time corresponding to the output duration of the fuel injection signal of the fuel injection valve which has carried out the expansion-stroke fuel injection is fetched. In succession, the above-mentioned predetermined value T is added to the accumulated value INT of the expansion-stroke fuel injection quantities. As shown in FIG. 6, the fuel injection quantity q is cumulatively added every operation cycle of the fuel injection valve. Accordingly, the accumulated value INT of the expansion-stroke fuel injection quantities in the expansion stroke increases as a function of time lapse. The accumulated value INT of the fuel injection quantities is clipped at a maximum value determined on the basis of the predetermined value K.

The fuel injection control system for the cylinder injection type engine according to the second embodiment of the invention features that the expansion-stroke fuel injection or exhaust-stroke fuel injection is enabled only for a time period taken for the value resulting from the integration or accumulation of the output durations of the fuel injection control signals to attain the predetermined value. In this conjunction, it is noted that the fuel injection quantity is proportional to the time period during which the fuel injection nozzle is held in the opened state, and hence the heat quantity applied to the catalyst is also approximately in proportion to the sum of the fuel injection periods. Accordingly, by storing previously in the ECU the accumulated or integrated value of the fuel injections or number of times the fuel injection is to be performed which is required for attaining a predetermined temperature, the proper temperature rise of the catalyst as well as prevention of discharge of the unburnt gas can be realized. Incidentally, the integrated value of the time durations of the fuel injection control signal may be determined by accumulating the actual fuel injection quantity which in turn can be determined on the basis of the fuel pressure, intra-cylinder pressure, dead time of the fuel injector and other factor.

Embodiment 3

Figure 7:
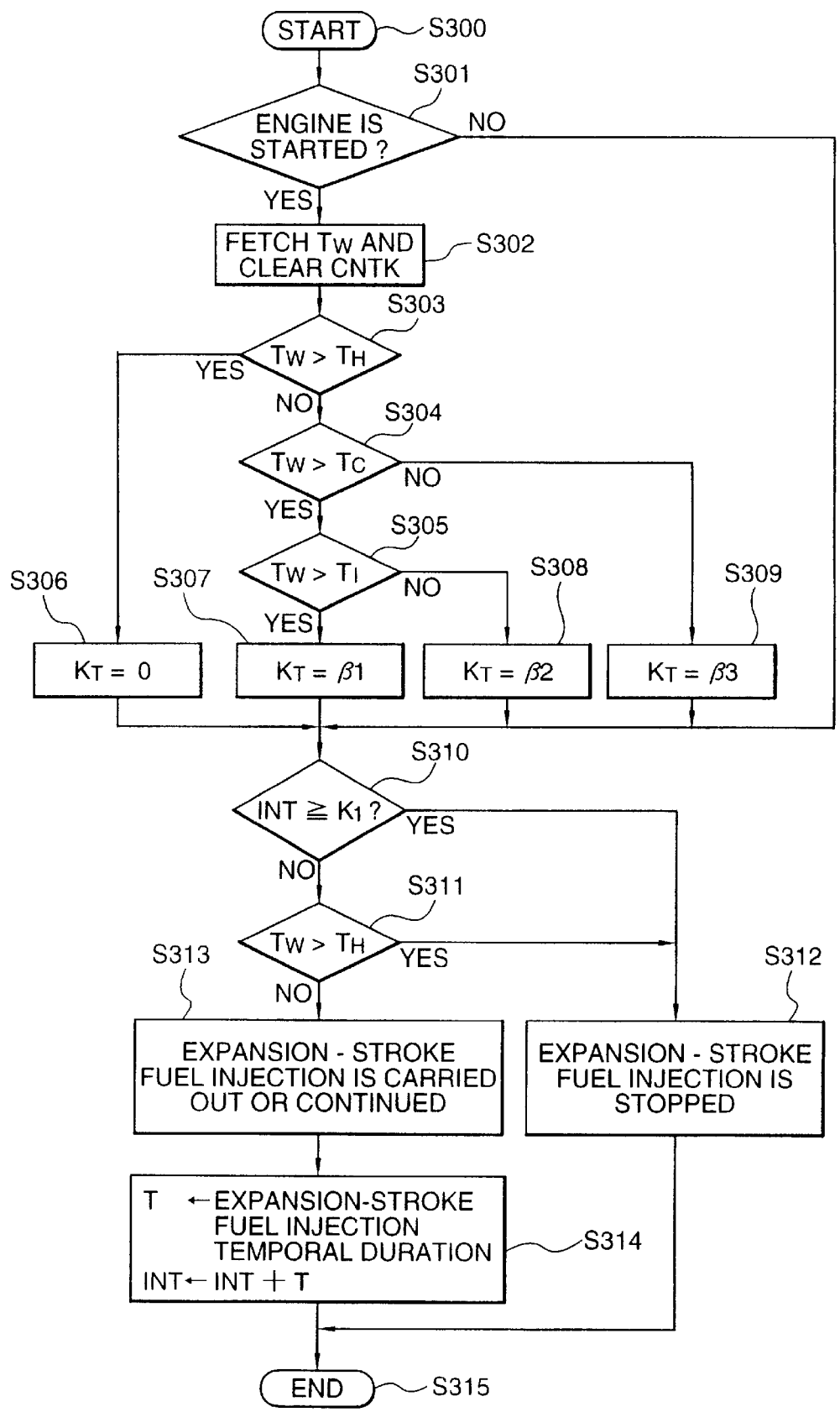
FIG. 7 is a flow chart for illustrating a control program executed by a fuel injection control system according to a third embodiment of the present invention.

Next, description will be made of a fuel injection control system according to a third embodiment of the present invention. FIG. 7 is a flow chart for illustrating contents of a control program executed by the fuel injection control system according to the instant embodiment of the invention. The control program now concerned is also repetitively executed by the ECU 22 once for two rotations of the crank shaft in a four-cycle cylinder injection type engine.

Referring to FIG. 7, when the control program is started in a step S300, it is then decided in a step S301 by the engine start detecting means (not shown) whether or not the engine is in the engine starting state or phase. When decision is made in the step S301 that the engine is in the starting state i.e., when the decision step S301 results in affirmation "Yes", execution of the control program or the processing proceeds to a step S302. On the other hand, when it is decided that the engine is not in the starting state i.e., when the result of the decision step S301 is negative "No", the processing proceeds to a step S310.

Parenthetically, with the phrase "starting state or phase" mentioned above, it is contemplated to mean the state in which the engine starter is being driven. Alternatively, the state in which the engine rotation speed (rpm) is lower than a predetermined value may be defined as the starting state. Further, the engine starting state may be determined by deciding whether or not the current execution of the control program now under consideration corresponds to the first run after the start thereof.

Subsequently, in the step S302, the engine temperature $T_W$ is fetched with the integrated or accumulated value INT mentioned previously being cleared. In a step S303, the engine temperature $T_W$ is compared with a predetermined warm-up temperature $T_H$. When the engine temperature $T_W$ is lower than the predetermined warm-up temperature $T_H$, the processing proceeds to a step S304. When the engine temperature $T_W$ is higher than the predetermined warm-up temperature $T_H$ as is in the case of the engine is restarted, the processing i.e., execution of the control program) proceeds to a step S306.

In the step S304, the engine temperature $T_W$ is compared with a predetermined low temperature $T_C$. The predetermined low temperature $T_c$ may be set at a cryogenic temperature, e.g. of −30° C.

When the engine temperature $T_W$ is higher than the predetermined low temperature $T_C$, the processing proceeds to a step S305 and, if otherwise, to a step S309. In the step S305, the engine temperature $T_W$ is compared with a predetermined temperature $T_1$ which is set to be lower than the predetermined warm-up temperature $T_H$ and higher than the predetermined low temperature $T_C$.

When the engine temperature $T_W$ is higher than the predetermined temperature $T_1$, the processing proceeds to a step S307. If otherwise, it proceeds to a step S308. In the steps S306 to S309, predetermined values $K_1$ are set for the integrated or accumulated values of the expansion-stroke fuel injections, respectively.

In the step S306, the predetermined accumulated value $K_1$ is set to zero, whereon the step S310 is executed. In the step S307, a predetermined value β1 stored previously in the ECU 22 in correspondence to the engine temperature $T_W$ ($T_H \geq T_W > T_1$) is set to $K_1$ as a predetermined or integrated accumulated value.

Similarly, a predetermined value β2 is set to $K_1$ in the step S308 with a predetermined value β3 being set to $K_1$ in the step S309 as predetermined integrated or accumulated values, respectively. In this way, the predetermined accumulated value is set to $K_1$ in dependence on the engine temperature $T_W$. In the step S310, a predetermined value $K_1$ which represents an integrated value of the fuel injection quantity required for the engine temperature $T_W$ to attain the predetermined temperature and which is previously stored in the ECU 22 is compared with the accumulated value INT of the fuel injection.

In the step S310, the predetermined value $K_1$ is compared with the accumulated value INT for thereby deciding whether or not the predetermined integrated value has been attained as of the start of the engine. A value obtained by integrating or accumulating the output periods of the expansion-stroke fuel injection signal as of the start of the engine is represented by a symbol INT. When it is decided that the accumulated value INT has attained the predetermined value $K_1$, execution of the control program proceeds to a step S312. If otherwise, it proceeds to a step S311.

In the step S311, decision is made as to whether or not the engine temperature $T_W$ is higher than the predetermined warm-up temperature $T_H$. In case the engine temperature $T_W$ is higher than the predetermined warm-up temperature $T_H$, the processing proceeds to a step S312 and, if otherwise, to a step S313.

In the step S313, the expansion-stroke fuel injection is carried out or continued. As a consequence, the second or secondary combustion takes place to thereby raise correspondingly the temperature of the catalyst, as described hereinbefore. In a step S314, the value T equivalent to a one-cycle valve opening time corresponding to the output duration of the fuel injection signal of the fuel injection valve which has carried out the expansion-stroke fuel injection is fetched. In succession, the above-mentioned value T is added to the accumulated or integrated value INT of the fuel injection quantities in the expansion stroke.

In the step S312, the expansion-stroke fuel injection is stopped. More specifically, when decision is made in the step S310 that the accumulated value resulting from accumulation of the fuel injection quantities from the time point the engine was started has attained the predetermined value $K_1$ or when it is decided in the step S311 that the engine temperature $T_W$ is higher than the predetermined warm-up temperature $T_H$, the expansion-stroke fuel injection control is stopped. Thus, the processing proceeds to a step S315 and then the control program comes to an end. Consequently, the ordinary engine operation state is resumed and continued without effecting the secondary combustion in the engine.

Thus, in the cylinder injection type engine according to the third embodiment of the present invention, accumulation or integration of the fuel injection signal output value is started upon starting of the engine i.e., from the first run of the control program, and a predetermined value for the integrated value is variably set in dependence on the temperature of the engine. When the predetermined value mentioned above or the predetermined engine temperature is exceeded, the expansion-stroke fuel injection or exhaust-stroke fuel injection is stopped. In this way, the temperature rise of the catalyst can be controlled with enhanced accuracy.

In the foregoing description of the fuel injection control system according to the third embodiment of the invention, it has been assumed that the aforementioned predetermined value of the fuel injection quantity is set variably and selectively at three accumulated values β1, β2 and β3. However, it goes without saying that a greater number of values can be selectively set as the aforementioned predetermined value $K_1$ by reading out selectively the predetermined accumulated value from the data map in accordance with the engine temperatures. At this juncture, it should be mentioned that an intake air temperature sensor, an oil temperature sensor, a catalyst temperature sensor, an exhaust gas temperature sensor or the like may also be used as the engine temperature sensor.

Embodiment 4

Figure 8:
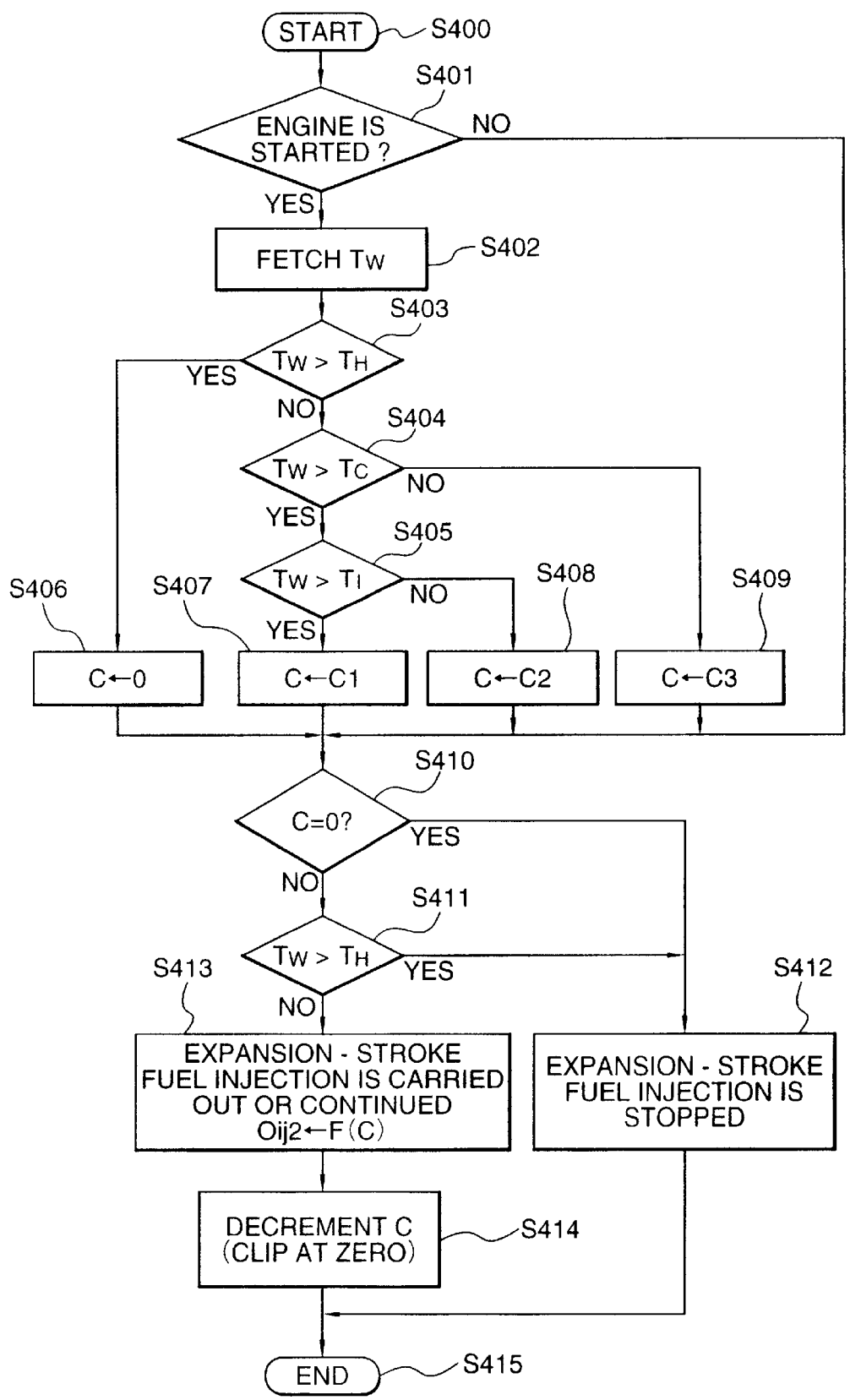
FIG. 8 is a timing chart for illustrating contents of the fuel injection control carried out by a fuel injection control system according to a fourth embodiment of the present invention.

Next, description will turn to the fuel injection control system according to a fourth embodiment of the present invention. FIG. 8 is a flow chart for illustrating contents of a control program executed by the fuel injection control system according to the instant embodiment. At first, it should be mentioned that the control program now of concern is repetitively executed by the ECU 22 once for two rotations of the crank shaft. Referring to FIG. 8, when the control program is started in a step S400, it is then detected in a step S401 by the engine start detecting means mentioned hereinbefore (not shown) whether or not the engine is in the engine starting state or phase.

When decision is made in the step S401 that the engine is in the starting state, execution of the control program proceeds to a step S402. On the other hand, when it is decided that the engine is not in the starting state or phase, the processing proceeds to a step S410. Parenthetically, with the phrase "starting state or phase" mentioned above, it is contemplated to mean the state in which the engine starter is being driven. Alternatively, the state in which the engine rotation speed (rpm) is lower than a predetermined value may be defined as the starting state or phase. Further, the engine starting state may be determined by deciding whether or not the current execution of the control program corresponds to the first run succeeding to the start thereof.

Subsequently, in the step S402, the engine temperature $T_W$ is fetched, which is followed by a step S403 where the engine temperature $T_W$ is compared with a predetermined warm-up temperature $T_H$ indicating the warmed-up state of the engine. When the engine temperature $T_W$ is higher than the predetermined warm-up temperature $T_W$ as is in the case where the engine is restarted), the processing proceeds to a step S406 and, if otherwise, to a step S404. In this step S404, the engine temperature $T_W$ is compared with a predetermined low temperature $T_C$. The predetermined low temperature $T_W$ may be set at a cryogenic temperature, e.g. of −30° C. By contrast, when the engine temperature $T_W$ is higher than the predetermined low temperature $T_C$, the processing proceeds to a step S405 and, if otherwise, to a step S409.

In the step S405, the engine temperature $T_W$ is compared with a predetermined temperature $T_1$ which is set to be lower than the predetermined warm-up temperature $T_H$ mentioned above and higher than the predetermined low temperature $T_C$ mentioned above. When the engine temperature $T_W$ is higher than the predetermined temperature $T_1$, the processing proceeds to a step S407. If otherwise, it proceeds to a step S408. In the step S406 to the step S409, initial values 0, C1, C2 and C3 for the counter C for the expansion-stroke fuel injection are set, respectively.

More specifically, in the step S410, the counter value C for the expansion-stroke fuel injection or the exhaust-stroke fuel injection is compared with zero for thereby making decision as to whether or not the expansion-stroke fuel injection is necessary. When the counter value C is zero, the processing proceeds to a step S412. If otherwise, the processing proceeds to a step S411. In the step S411, decision is made as to whether or not the engine temperature $T_W$ is higher than the predetermined warm-up temperature $T_H$ mentioned previously.

Figure 9:
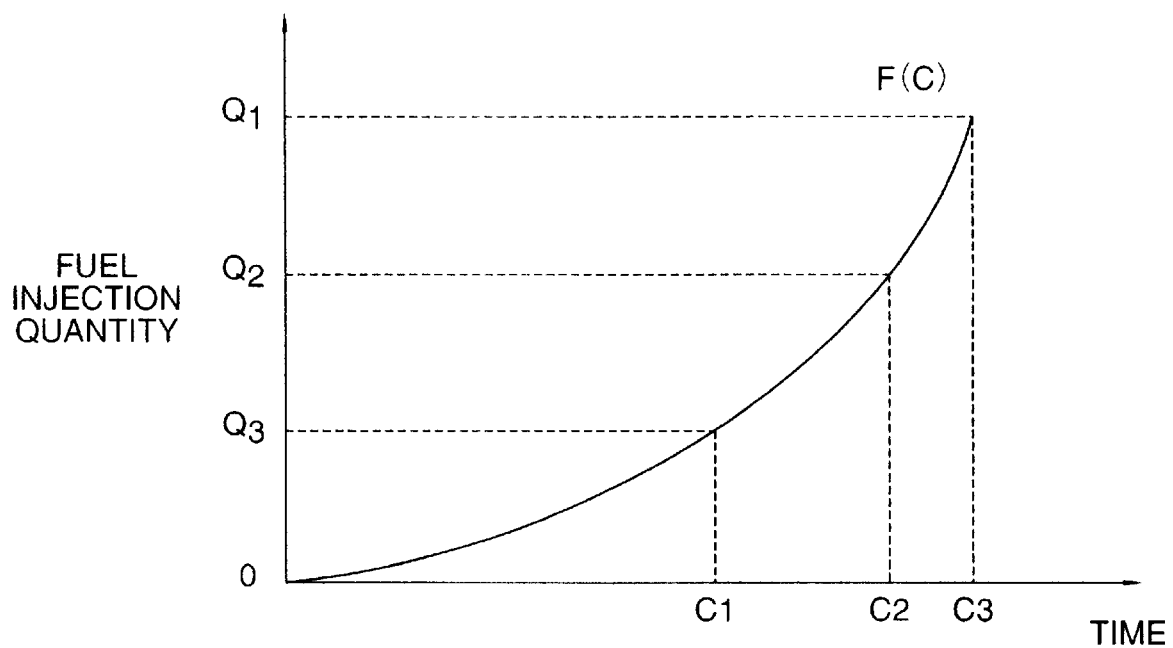
FIG. 9 is a graph for illustrating the contents of the fuel injection control carried out by the fuel injection control system according to the fourth embodiment of the present invention.

In case the engine temperature $T_W$ is higher than the predetermined warm-up temperature $T_H$, the processing proceeds to a step S412 and, if otherwise, to a step S413. In the step S412, the expansion-stroke fuel injection is intercepted. On the other hand, in the step S413, the expansion-stroke fuel injection control is executed or continued. The fuel injection quantity $Q_{ij2}$ is determined as a function F(C) of the counter value C illustrated in FIG. 9. Thus, the fuel injection quantity $Q_{ij2}$ can be represented by the expression "$Q_{ij2}=F(C)$". Subsequently, in a step S414, the counter value C is decremented and clipped at a minimum value, e.g. zero. In this manner, the second or secondary combustion takes place, as described previously, to contribute to the temperature rise of the catalyst. Finally, the processing proceeds to a step S415, where execution of the control program comes to an end.

As is apparent from the above, with the fuel injection control system according to the fourth embodiment of the present invention, the fuel injection quantity per cycle of the expansion-stroke fuel injection is decreased gradually as a function of the engine speed (rpm) such that the fuel injection quantity is reduced to zero after a predetermined number of times the expansion stroke has been carried out. Incidentally, although the expansion-stroke fuel injection quantity is decreased gradually as a curvilinear function F(C) of the number of times (C) the expansion stroke has been executed after the start of the engine, the above-mentioned function may be linear.

Through the fuel injection control described above, the heat quantity applied to the catalyst is gradually decreased as a function of time lapse, whereby the temperature of the catalyst can be stabilized at a predetermined value without occurrence of overshoot. Thus, appropriate heating of the catalyst which conforms with the actual temperature of the catalyst can be realized while preventing discharge of the unburned gas components with high reliability.

Embodiment 5

Figure 10A:
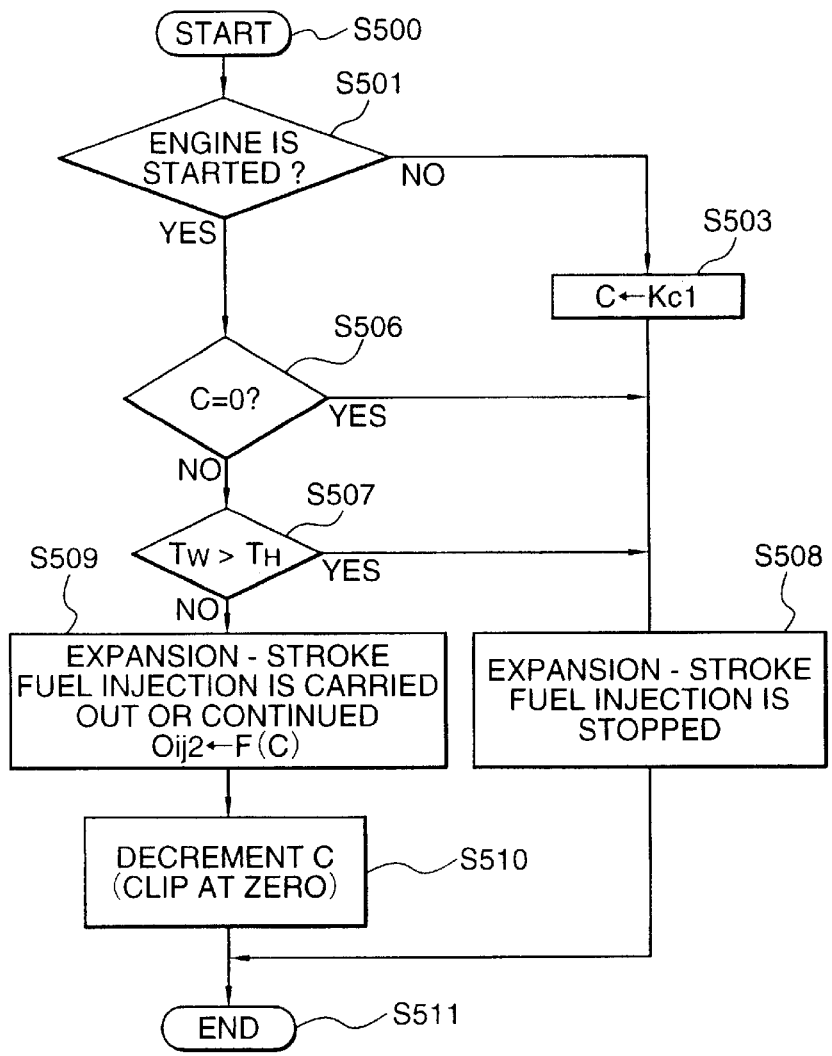
FIG. 10A is a flow chart for illustrating contents of a control program executed by a fuel injection control system according to a fifth embodiment of the present invention.
Figure 10B:
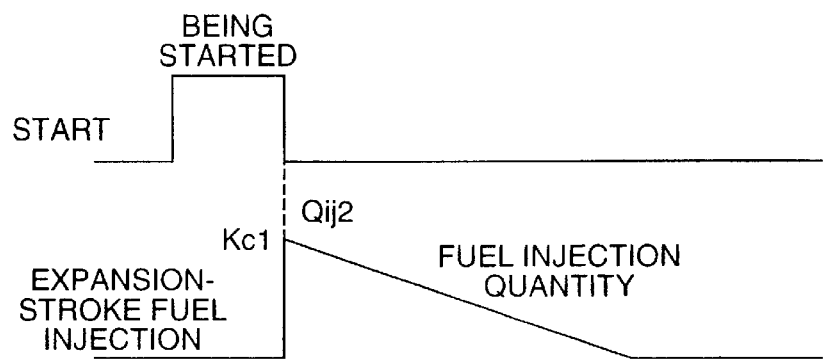
FIG. 10B is a timing chart for illustrating operation of the same.

Next, operation of the fuel injection control system according to a fifth embodiment of the invention will be described. FIG. 10A is a flow chart for illustrating contents of a control program executed by the fuel injection control system according to the instant embodiment and FIG. 10B is a timing chart for illustrating operation of the same. Similarly to the case of the fuel injection control systems described hereinbefore, the control program now of concern is repetitively executed by the ECU 22 once for two rotations of the crank shaft.

Referring to FIG. 10A, when the control program is started in a step S500, it is then detected in a step S501 by an engine-start completion detecting means (not shown either) whether or not the engine starting operation has been completed.

When decision is made in the step S501 that the engine starting operation has been completed, the processing proceeds to a step S506. On the other hand, when it is decided that the engine starting operation has not yet been completed, the processing proceeds to a step S503.

In the step S503, a predetermined value $K_{c1}$ is set to a counter C for the expansion-stroke or exhaust-stroke fuel injection, whereon the processing proceeds to a step S508. In that case, the predetermined value $K_{c1}$ mentioned above is previously stored in the ECU 22. In the step S506, the value of the above-mentioned counter C is compared with zero to thereby make decision as to whether or not the expansion-stroke fuel injection is necessary. When the value of the counter C is zero, the processing proceeds to a step S508. If otherwise, the processing proceeds to a step S507.

In the step S507, decision is made as to whether or not the engine temperature $T_W$ is higher than the predetermined warm-up temperature $T_H$, as described hereinbefore. In case the engine temperature $T_W$ is higher than the predetermined warm-up temperature $T_H$, the processing proceeds to a step S508 or alternatively to a step S509, if otherwise. In the step S508, the expansion-stroke fuel injection is intercepted. On the other hand, in the step S509, the expansion-stroke fuel injection control is executed or continued. The fuel injection quantity $Q_{ij2}$ is determined as a function F(C) of the counter value C illustrated in FIG. 9. Thus, the fuel injection quantity $Q_{ij2}$ can be represented by $Q_{ij2}$=F(C). Subsequently, in a step S510, the counter value C is decremented and clipped at a minimum value, e.g. zero. In this manner, the second combustion takes place, as described previously, to contribute to the temperature rise of the catalyst. Finally, the processing proceeds to a step S511 where execution of the control program comes to an end.

As can be seen from FIG. 10B, in the fuel injection control system according to the instant embodiment of the invention, the expansion-stroke fuel injection control is effectuated after the engine starting operation has been completed. Thus, there can be evaded such unwanted events as the engine stall, abnormal rotation or the like which may occur due to external disturbance possibly brought about by the expansion-stroke fuel injection control effected during the engine starting operation. In mother words, heating of the catalyst can be carried out after the rotation speed (rpm) of the engine has been stabilized after completion of the engine starting operation.

Figure 11A:
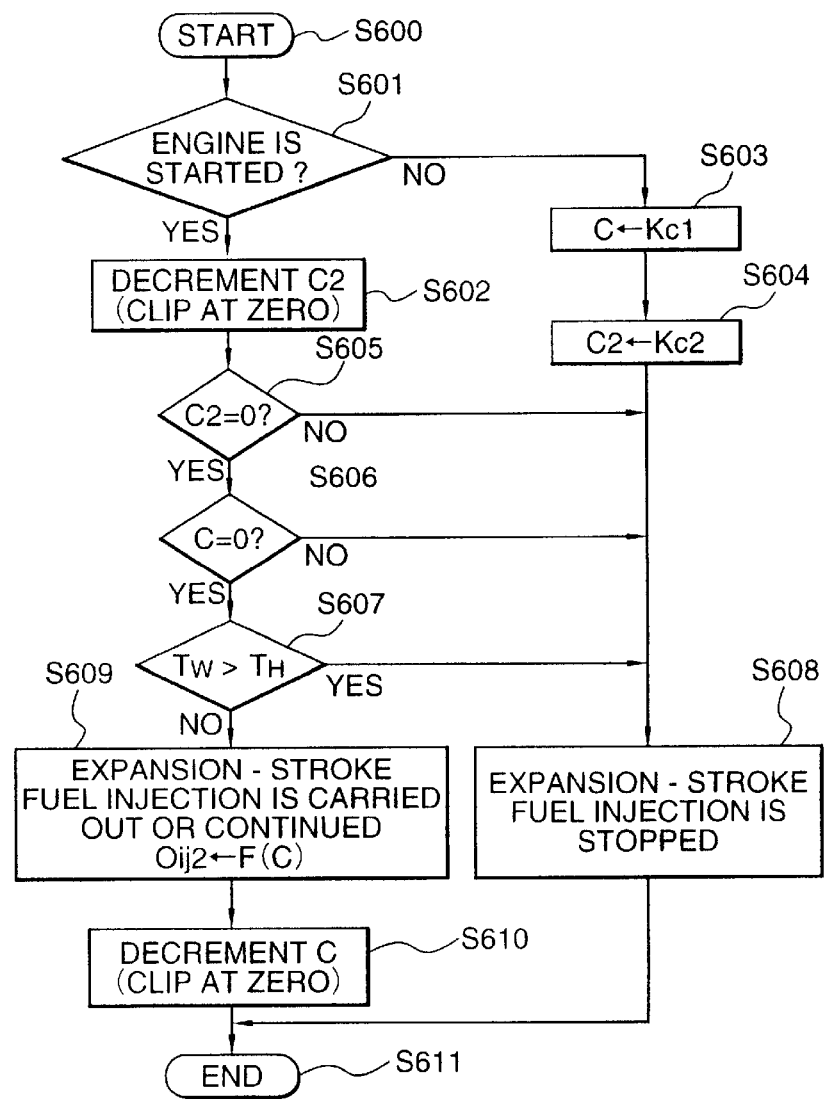
FIG. 11A is a flow chart for illustrating contents of a modified control program executed by the fuel injection control system according to the fifth embodiment of the present invention.
Figure 11B:
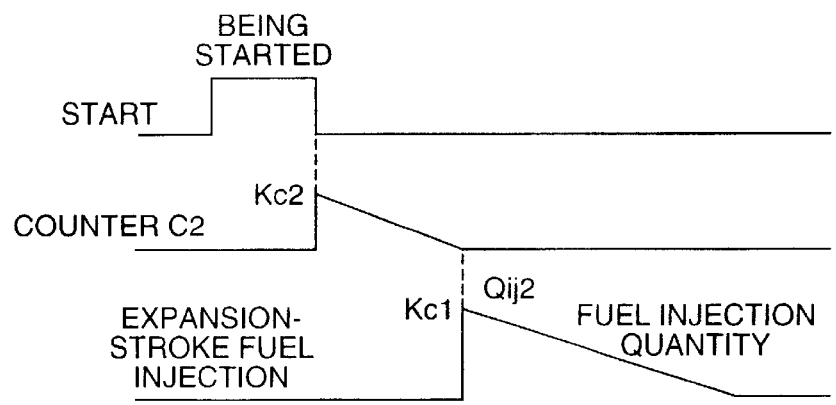
FIG. 11B is a timing chart for illustrating the same.

Next, description will be made of modified operation of the fuel injection control system according to the fifth embodiment of the present invention. FIGS. 11A and 11B are views for illustrating contents of a modified fuel injection control program according to the instant embodiment of the invention. More specifically, FIG. 11A is a flow chart for illustrating contents of the modified control program executed by the fuel injection control system according to the instant embodiment, and FIG. 11B is a timing chart for illustrating the same. Referring to FIG. 11A, when the control program is started in a step S600, it is then detected in a step S601 by the engine-start completion detecting means(not shown) mentioned previously whether or not the engine starting operation has been successfully completed. When the decision step S601 results in affirmation "Yes", execution of the control program or the processing proceeds to a step S602. On the other hand, when it is decided that the engine starting operation has not yet completed i.e., when the result of the decision step S601 is negative "No", the processing proceeds to a step S603.

In the step S603, a predetermined value $K_{c1}$ is set at the counter C for the expansion-stroke or exhaust-stroke fuel injection. Then, in a step S604, a predetermined value $K_{c2}$ is set at a counter C2 destined for detecting a predetermined time elapsed as of the completion of the engine starting operation, whereon the processing proceeds to a step S608. The above-mentioned predetermined values $K_{c1}$ and $K_{c2}$ are previously stored in the ECU 22. In the step S602, the counter value C2 is decremented. Decrementation of the counter value C2 is started upon successful completion of the engine starting operation and clipped at a minimum value, e.g. zero.

In the step S605, decision is made as to whether or not the counter value C2 is zero. When the counter value C2 is equal to zero, this means that the aforementioned predetermined time has lapsed from the time point at which the engine starting operation has been completed successfully. Consequently, the processing proceeds to a step S606. If otherwise, the processing proceeds to a step S608. In the step S606, the counter value C mentioned above is compared with zero, for thereby deciding whether or not the expansion-stroke fuel injection is necessary. When the counter value C is zero, the processing proceeds to the step S608. If otherwise, it proceeds to the step S607 to make decision as to whether or not the engine temperature $T_W$ is higher than the predetermined warm-up temperature $T_H$.

In case the engine temperature $T_W$ is higher than the predetermined warm-up temperature $T_H$, the processing proceeds to the step S608 and, if otherwise, to a step S609. In the step S608, the expansion-stroke fuel injection is stopped. On the other hand, in the step S609, the expansion-stroke fuel injection control is carried out or continued. The fuel injection quantity $Q_{ij2}$ is determined as a function F(C) of the counter value C illustrated in FIG. 9. Thus, the fuel injection quantity $Q_{ij2}$ can be represented by $Q_{ij2}$=F(C).

Subsequently, in a step S610, the counter value C is decremented and clipped at a minimum value, e.g. zero. In this manner, the second or secondary combustion can take place, as described previously, to raise the temperature of the catalyst.

Finally, the processing proceeds to a step S611 where execution of the control program comes to an end. As can be seen from FIG. 11B, in the modified fuel injection control according to the instant embodiment of the invention, the expansion-stroke or exhaust-stroke fuel injection is started after lapse of a predetermined time in succession to the completion of the engine starting operation. Thus, there can be evaded such unwanted events as the engine stall, abnormal rotation of the engine or the like which may occur due to external disturbances which may possibly be brought about by the fuel injection control effected immediately after the engine starting operation in the state where the rotation is unstable. In other words, rapid heating of the catalyst can be realized while ensuring the stability of the engine operation.

Embodiment 6

Next, description will be directed to a sixth embodiment of the invention. The fuel injection control system according to the instant embodiment features that the expansion-stroke fuel injection control or alternatively the exhaust-stroke fuel injection control is effectuated only for particular ones of the cylinders. In this conjunction, it is noted that with the fuel injection quantity which is smaller than a predetermined quantity in carrying out the expansion-stroke fuel injection, the combustion in the expansion stroke may become instable. On the other hand, when the expansion-stroke fuel injection is carried out with the fuel injection quantity exceeding the predetermined quantity for all the cylinders, the catalyst may possibly be heated in excess undesirably.

More specifically, in the case of a four-cylinder engine, only the ordinary fuel injection is performed for two cylinders (#1 and #4) while for the other cylinders (#2 and #3), the expansion-stroke fuel injection or alternatively the exhaust-stroke fuel injection is performed in addition to the ordinary fuel injection, as is shown in FIG. 12. In that case, the catalyst can be heated very accurately with a desirable heat quantity by ensuring the fuel injection quantity ($I_{j2}$) capable of sustaining the stable expansion-stroke fuel injection and combustion.

Furthermore, it is also possible to carry out the ordinary fuel injection only for the two cylinders (#1 and #4) with the expansion-stroke fuel injection or alternatively the exhaust-stroke fuel injection being effected for all the four cylinders to thereby promote the temperature rise of the catalyst while reducing the fuel cost involved in sustaining the idle rotation of the engine, as is illustrated in FIG. 13. Additionally, it is also possible to realize the catalyst heating optimally with minimum fuel consumption by effectuating the ordinary fuel injection only for the two cylinders (#1 and #4) while effectuating the expansion-stroke fuel injection or alternatively the exhaust-stroke fuel injection for the other cylinders (#2 and #3), as is illustrated in FIG. 14.

Figure 14:
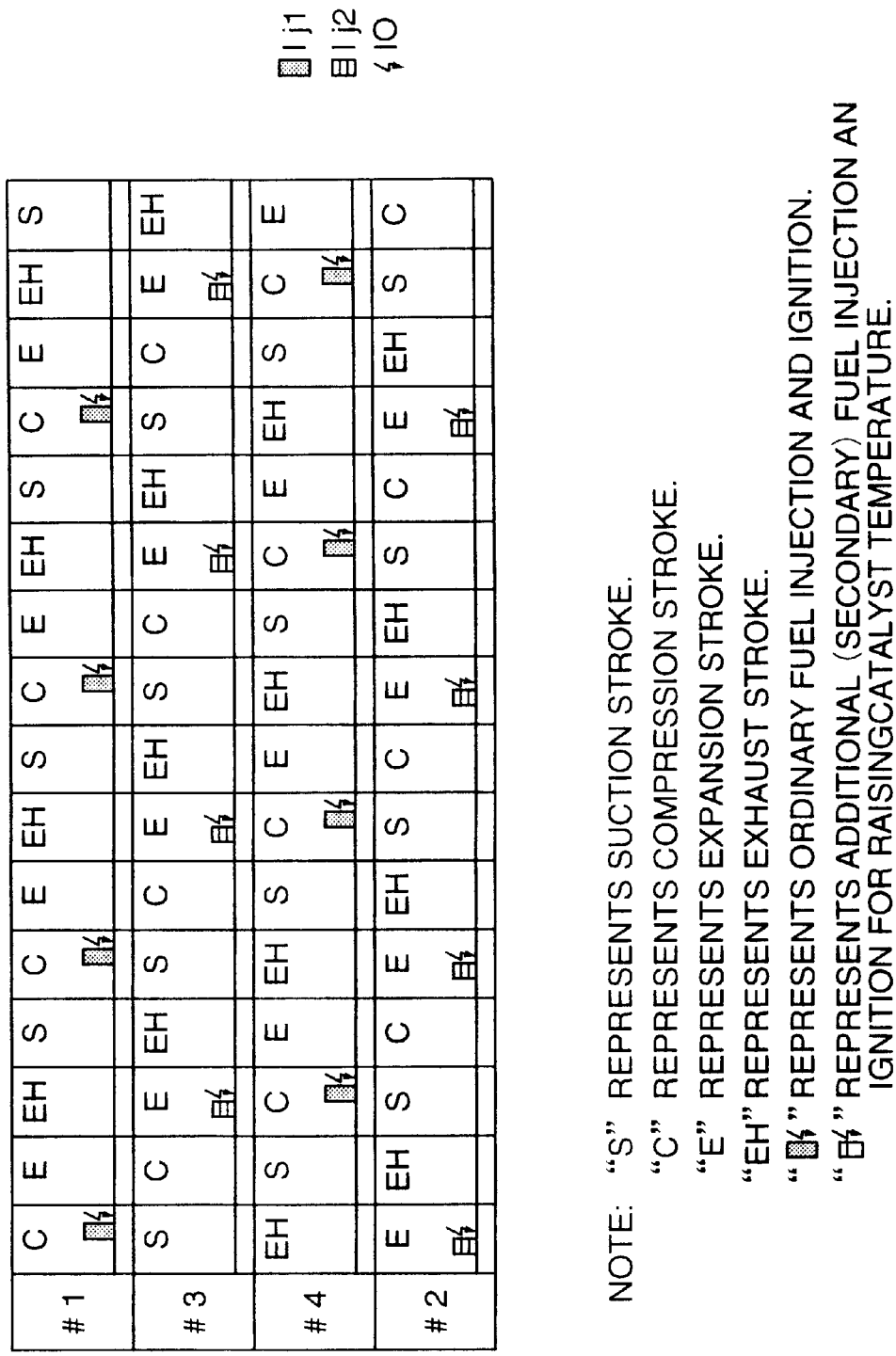
FIG. 14 is a timing chart for illustrating another modified fuel injection control which can be carried out by the fuel injection control system according to the sixth embodiment of the present invention.

Further, the ordinary fuel injection and expansion-stroke or alternatively the exhaust-stroke fuel injection may be conducted only for two identical cylinders, as is illustrated in FIG. 14.

Incidentally, in the case of the exemplary embodiments illustrated in FIGS. 12 to 14, respectively, it has been assumed that the second ignition $I_{g2}$ is effected in the expansion stroke in succession to the second fuel injection $I_{j2}$. However, the combustion may be triggered by self-ignition without resorting to the second or secondary ignition $I_{g2}$. Besides, the second ignition $I_{g2}$ may be effected during the exhaust stroke.

Many modifications and variations of the present invention are possible in the light of the above techniques. It is therefore to be understood that within the scope of the appended claims, the invention may be practiced otherwise than as specifically described.

What is claimed is:

1. A fuel injection control system for an internal combustion engine of a cylinder injection type, wherein fuel is injected directly into a cylinder through a fuel injection valve, comprising:

engine start detecting means for detecting starting of said internal combustion engine;

temperature detecting means for detecting a temperature of said engine;

engine low-temperature state detecting means for detecting whether said engine is in a cold state by comparing a detected value derived from an output of said temperature detecting means with a predetermined value stored previously; and control means for controlling said fuel injection valve so as to effectuate one of an expansion-stroke fuel injection during an expansion stroke and an exhaust-stroke fuel injection during an exhaust stroke, for a predetermined time period after a start of the fuel injection, provided that starting of said internal combustion engine is detected from an output of said engine start detecting means and that a low-temperature state of said engine is detected from an output of said engine low-temperature state detecting means;

wherein said control means performs said one of expansion-stroke fuel injection and said exhaust-stroke fuel injection during a time period which is required for a value resulting from integration of output values of the fuel injection quantity control signal to attain a predetermined accumulated value.

2. A fuel injection control system for an internal combustion engine of a cylinder injection type according to claim 1, wherein said predetermined accumulated value is set variably in dependence on a detection value derived from the output of said temperature detecting means.

3. A fuel injection control system for an internal combustion engine of a cylinder injection type according to claim 1, wherein said control means gradually decreases the fuel injection quantity in the expansion-stroke fuel injection as one of a function of time lapse and as a function of a number of times the expansion stroke has been carried out.

4. A fuel injection control system for an internal combustion engine of a cylinder injection type according to claim 1, wherein said control means starts said one of expansion-stroke fuel injection and said exhaust-stroke fuel injection after one of the engine starting operation has been successfully completed and after lapse of a predetermined time in succession to a successful completion of said engine starting operation.

5. A fuel injection control system for an internal combustion engine of a cylinder injection type according to claim 1, wherein said control means effectuates fuel injection in one of the expansion stroke and in the exhaust stroke for a particular portion of a plurality of cylinders of an internal combustion engine.

6. A fuel injection control system for an internal combustion engine of a cylinder injection type, wherein fuel is injected directly into a cylinder through a fuel injection valve, comprising:

engine start detecting means for detecting starting of said internal combustion engine;

temperature detecting means for detecting a temperature of said engine;

engine low-temperature state detecting means for detecting whether said engine is in a cold state by comparing a detected value derived from an output of said temperature detecting means with a predetermined value stored previously; and control means for controlling said fuel injection valve so as to effectuate one of an expansion-stroke fuel injection during an expansion stroke and an exhaust-stroke fuel injection during an exhaust stroke, for a predetermined time period after a start of the fuel injection, provided that starting of said internal combustion engine is detected from an output of said engine start detecting means and that a low-temperature state of said engine is detected from an output of said engine low-temperature state detecting means;

wherein said control means effectuates fuel injection in one of the expansion stroke and in the exhaust stroke only for a particular portion of a plurality of cylinders of the internal combustion engine.

* * * * *